United States Patent
Fattal (10) Patent No.: US 10,684,404 B2
(45) Date of Patent: Jun. 16, 2020

(54) DIFFRACTION GRATING-BASED BACKLIGHTING HAVING CONTROLLED DIFFRACTIVE COUPLING EFFICIENCY

(71) Applicant: LEIA INC., Menlo Park, CA (US)

(72) Inventor: David A. Fattal, Mountain View, CA (US)

(73) Assignee: LEIA INC., Menlo Park, CA (US)

( * ) Notice: Subject to any disclaimer, the term of this patent is extended or adjusted under 35 U.S.C. 154(b) by 19 days.

(21) Appl. No.: 15/640,173

(22) Filed: Jun. 30, 2017

(65) Prior Publication Data

US 2017/0299793 A1 Oct. 19, 2017

Related U.S. Application Data

(63) Continuation of application No. PCT/US2015/010935, filed on Jan. 10, 2015.

(51) Int. Cl.
*F21V 8/00* (2006.01)
*G02B 5/18* (2006.01)
(Continued)

(52) U.S. Cl.
CPC ........... *G02B 6/005* (2013.01); *G02B 5/1828* (2013.01); *G02B 6/0036* (2013.01); *G02B 30/27* (2020.01);
(Continued)

(58) Field of Classification Search
CPC .. G02B 6/0036; G02B 6/0038; G02B 6/0045; G02B 6/005; G02B 6/0051
See application file for complete search history.

(56) References Cited

U.S. PATENT DOCUMENTS 5,561,558 A * 10/1996 Shiono ................. G02B 5/1876
359/565
5,615,024 A 3/1997 May et al.
(Continued)

FOREIGN PATENT DOCUMENTS

CN 1213097 A 4/1999
CN 1619373 A 5/2005
(Continued)

OTHER PUBLICATIONS

International Search Report (ISR), 3 pages, from KIPO (ISA/KR), dated Sep. 22, 2015, for counterpart parent PCT patent application No. PCT/US2015/010935.
(Continued)

*Primary Examiner* — Zheng Song
(74) *Attorney, Agent, or Firm* — J. Michael Johnson (57) ABSTRACT

Diffraction grating-based backlighting having controlled diffractive coupling efficiency includes a light guide and a plurality of diffraction gratings at a surface of the light guide. The light guide is to guide light and the diffraction gratings are to couple out a portion of the guided light using diffractive coupling and to direct the coupled-out portion away from the light guide surface as a plurality of light beams at a principal angular direction. Diffraction gratings of the plurality include diffractive features having a diffractive feature modulation configured to selectively control a diffractive coupling efficiency of the diffraction gratings as a function of distance along the light guide surface.

20 Claims, 4 Drawing Sheets

(51) Int. Cl.
   *G02B 30/27* (2020.01)
   *G02F 1/29* (2006.01)
   *G02B 6/124* (2006.01)

(52) U.S. Cl.
   CPC .............. *G02F 1/292* (2013.01); *G02B 6/124* (2013.01); *G02F 2201/305* (2013.01)

(56) References Cited

U.S. PATENT DOCUMENTS

| | | | |
|---|---|---|---|
| 5,617,248 | A | 4/1997 | Takahashi et al. |
| 5,721,598 | A | 2/1998 | Smith |
| 5,729,311 | A | 3/1998 | Broer et al. |
| 5,926,294 | A | 7/1999 | Sato et al. |
| 6,011,602 | A * | 1/2000 | Miyashita ............ G02B 6/0038 349/61 |
| 6,667,819 | B2 | 12/2003 | Nishikawa et al. |
| 6,773,126 | B1 * | 8/2004 | Hatjasalo ............ G02B 6/0036 362/336 |
| 6,980,271 | B2 | 12/2005 | Fujishiro |
| 7,085,056 | B2 | 8/2006 | Chen et al. |
| 7,527,416 | B2 | 5/2009 | Lin |
| 7,742,120 | B2 | 6/2010 | Bayley et al. |
| 7,773,849 | B2 | 8/2010 | Shani |
| 7,903,332 | B2 | 3/2011 | De Zwart et al. |
| 8,026,997 | B2 | 9/2011 | Feng |
| 8,619,363 | B1 | 12/2013 | Coleman |
| 8,681,423 | B1 | 3/2014 | Gibson et al. |
| 8,781,276 | B2 | 7/2014 | Fattal et al. |
| 9,128,226 | B2 | 9/2015 | Fattal et al. |
| 9,201,270 | B2 | 12/2015 | Fattal et al. |
| 9,298,168 | B2 | 3/2016 | Taff et al. |
| 9,389,415 | B2 | 7/2016 | Fattal et al. |
| 9,459,461 | B2 | 10/2016 | Santori et al. |
| 9,557,466 | B2 | 1/2017 | Fattal |
| 2002/0008834 | A1 | 1/2002 | Suzuki |
| 2002/0075445 | A1 | 6/2002 | Dabrowski et al. |
| 2003/0086649 | A1 | 5/2003 | Zhou |
| 2004/0130879 | A1 | 7/2004 | Choi et al. |
| 2004/0156182 | A1 | 8/2004 | Hatjasalo et al. |
| 2004/0156589 | A1 | 8/2004 | Gunn et al. |
| 2005/0041174 | A1 | 2/2005 | Numata et al. |
| 2005/0073627 | A1 | 4/2005 | Akiyama |
| 2005/0123229 | A1 | 6/2005 | Huck et al. |
| 2005/0140832 | A1 | 6/2005 | Goldman et al. |
| 2005/0201122 | A1 | 9/2005 | Shinohara et al. |
| 2005/0213348 | A1 | 9/2005 | Parikka et al. |
| 2005/0264717 | A1 | 12/2005 | Chien et al. |
| 2006/0008347 | A1 | 4/2006 | Winkler |
| 2006/0104570 | A1 | 5/2006 | Rausch |
| 2006/0187677 | A1 * | 8/2006 | Parikka ............... G02B 6/0031 362/619 |
| 2007/0058394 | A1 * | 3/2007 | Yu ....................... G02B 6/0038 362/615 |
| 2007/0129864 | A1 | 6/2007 | Tanaka et al. |
| 2007/0213955 | A1 | 9/2007 | Ishida et al. |
| 2007/0279367 | A1 | 12/2007 | Kitai |
| 2007/0298533 | A1 | 12/2007 | Yang et al. |
| 2008/0204663 | A1 | 8/2008 | Balogh |
| 2008/0204873 | A1 | 8/2008 | Daniell |
| 2008/0225393 | A1 | 9/2008 | Rinko |
| 2008/0285307 | A1 * | 11/2008 | Aylward ............. G02B 6/0028 362/618 |
| 2009/0091837 | A1 | 4/2009 | Chao et al. |
| 2009/0207342 | A1 | 8/2009 | Yamaguchi et al. |
| 2009/0213300 | A1 | 8/2009 | Daiku |
| 2009/0244706 | A1 | 10/2009 | Levola et al. |
| 2009/0290837 | A1 | 11/2009 | Chen et al. |
| 2009/0322986 | A1 | 12/2009 | Wei et al. |
| 2010/0039832 | A1 | 2/2010 | Ahlgren et al. |
| 2010/0103485 | A1 | 4/2010 | Haussler |
| 2010/0118117 | A1 | 5/2010 | Kroll |
| 2010/0123952 | A1 | 5/2010 | Chen et al. |
| 2010/0141868 | A1 | 6/2010 | St. Hilaire et al. |
| 2010/0188602 | A1 * | 7/2010 | Feng ..................... G02B 6/005 349/62 |
| 2010/0207964 | A1 | 8/2010 | Kimmel et al. |
| 2010/0284085 | A1 | 11/2010 | Laakkonen |
| 2010/0289870 | A1 | 11/2010 | Leister |
| 2010/0302803 | A1 | 12/2010 | Bita et al. |
| 2011/0002143 | A1 | 1/2011 | Saarikko et al. |
| 2011/0051035 | A1 | 3/2011 | Papakonstantinou |
| 2011/0141395 | A1 | 6/2011 | Yashiro |
| 2011/0149596 | A1 | 6/2011 | Lv et al. |
| 2011/0157257 | A1 | 6/2011 | Bennett et al. |
| 2011/0157667 | A1 | 6/2011 | Lacoste et al. |
| 2011/0182570 | A1 | 7/2011 | Yeh |
| 2011/0241573 | A1 | 10/2011 | Tsai et al. |
| 2011/0254916 | A1 | 10/2011 | Fan et al. |
| 2011/0304784 | A1 | 12/2011 | Hirota et al. |
| 2012/0008067 | A1 | 1/2012 | Mun et al. |
| 2012/0013962 | A1 | 1/2012 | Subbaraman et al. |
| 2012/0075698 | A1 | 3/2012 | Minami |
| 2012/0113678 | A1 | 5/2012 | Cornelissen et al. |
| 2012/0120213 | A1 | 5/2012 | Ohyama et al. |
| 2012/0127547 | A1 | 5/2012 | Gocho et al. |
| 2012/0127573 | A1 | 5/2012 | Robinson et al. |
| 2012/0127751 | A1 | 5/2012 | Kimmel |
| 2012/0176665 | A1 | 7/2012 | Song et al. |
| 2012/0249934 | A1 | 10/2012 | Li et al. |
| 2012/0250141 | A1 | 10/2012 | Chen |
| 2012/0281950 | A1 * | 11/2012 | Fattal ................. G02B 6/02061 385/37 |
| 2013/0057539 | A1 | 3/2013 | Kim |
| 2013/0082980 | A1 | 4/2013 | Gruhlke et al. |
| 2013/0100695 | A1 * | 4/2013 | Yankov ................ G02B 6/0035 362/602 |
| 2013/0201723 | A1 | 8/2013 | Gourlay |
| 2014/0043847 | A1 | 2/2014 | Yang et al. |
| 2014/0111856 | A1 | 4/2014 | Brug et al. |
| 2014/0293759 | A1 * | 10/2014 | Taff ...................... G02B 5/1819 368/239 |
| 2015/0003106 | A1 | 1/2015 | Thompson et al. |
| 2015/0355403 | A1 | 12/2015 | Santori et al. |
| 2016/0018582 | A1 | 1/2016 | Fiorentino et al. |
| 2017/0090096 | A1 | 3/2017 | Fattal |

FOREIGN PATENT DOCUMENTS

| | | |
|---|---|---|
| CN | 101750664 A | 6/2010 |
| CN | 202126538 | 1/2012 |
| JP | H08190095 A | 7/1996 |
| JP | 1998253955 A | 9/1998 |
| JP | 1998268229 A | 9/1998 |
| JP | 2000267041 A | 9/2000 |
| JP | 2002031788 A | 1/2002 |
| JP | 2004077897 A | 3/2004 |
| JP | 2004302186 A | 10/2004 |
| JP | 2004319252 A | 11/2004 |
| JP | 2008083532 A | 4/2008 |
| JP | 2008164963 A | 7/2008 |
| JP | 2009053499 A | 3/2009 |
| JP | 2009288718 A | 12/2009 |
| JP | 2010102188 A | 5/2010 |
| JP | 2010237416 A | 10/2010 |
| JP | 2011029161 A | 2/2011 |
| JP | 2011133677 A | 7/2011 |
| JP | 2011232717 A | 11/2011 |
| JP | 2012022085 A | 2/2012 |
| WO | 9908257 A1 | 2/1999 |
| WO | 2012069071 A1 | 5/2012 |
| WO | 2014051623 A1 | 4/2014 |

OTHER PUBLICATIONS

Vo, Sonny et al., "Sub-wavelength Grating Lenses with a Twist," IEEE Photonics Technology Letters, Jul. 1, 2014, pp. 1375-1378, vol. 26, No. 13 (listed in search report by Taiwan Intellectual Property Office for counterpart foreign application in Taiwan, No. 105100041).

(56) References Cited

OTHER PUBLICATIONS

Choi, Hwan Young et al., "Design and Analysis of Diffractive Grating Imprinted Light-guide Plate for LCD Illumination," Journal of Information Display, 2004, pp. 7-15, vol. 5, No. 1.
Park, Seung Ryong et al., "Grating micro-dot patterned light guide plates for LED backlights," Optics Express, Mar. 19, 2007, pp. 2888-2899, vol. 15, No. 6, Optical Society of America.
Son, Jung-Young et al., "Three-Dimensional Imaging Methods Based on Multiview Images," IEEE/OSA Journal of Display Technology, Sep. 2005, pp. 125-140, vol. 1, No. 1.
Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.
Reichelt et al.,"Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.
Xu et al., "Computer-Generated Holography for Dynamic Display of 3D Objects with Full Parallax," International Journal of Virtual Reality, 2009, pp. 33-38, vol. 8, No. 2.
Travis et al., "Collimated light from a waveguide for a display backlight," Optics Express, Oct. 2009, pp. 19714-19719, vol. 17, No. 22.
Fattal, David et al., "A multi-directional backlight for a wide-angle, glasses-free three-dimensional display," Nature, Mar. 21, 2013, pp. 348-351, vol. 495, Macmillan Publishers Limited, 2013. (Also listed in search report by Taiwan Intellectual Property Office for counterpart foreign application in Taiwan, No. 105100041.).

* cited by examiner

DIFFRACTION GRATING-BASED BACKLIGHTING HAVING CONTROLLED DIFFRACTIVE COUPLING EFFICIENCY

CROSS-REFERENCE TO RELATED APPLICATIONS

This application is a continuation application of and claims the benefit of priority to prior International Application No. PCT/US2015/010935, filed Jan. 10, 2015, the entire contents of which is incorporated herein by reference.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Among the most commonly found electronic displays are the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). In general, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

To overcome the limitations of passive displays associated with emitted light, many passive displays are coupled to an external light source. The coupled light source may allow these otherwise passive displays to emit light and function substantially as an active display. Examples of such coupled light sources are backlights. Backlights are light sources (often panel light sources) that are placed behind an otherwise passive display to illuminate the passive display. For example, a backlight may be coupled to an LCD or an EP display. The backlight emits light that passes through the LCD or the EP display. The light emitted is modulated by the LCD or the EP display and the modulated light is then emitted, in turn, from the LCD or the EP display. Often backlights are configured to emit white light. Color filters are then used to transform the white light into various colors used in the display. The color filters may be placed at an output of the LCD or the EP display (less common) or between the backlight and the LCD or the EP display, for example.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Certain examples and embodiments may have other features that are one of in addition to and in lieu of the features illustrated in the above-referenced figures. These and other features are detailed below with reference to the above-referenced figures.

DETAILED DESCRIPTION

Embodiments in accordance with the principles described herein provide electronic display backlighting using diffractive feature modulation to control diffractive coupling strength or efficiency. In particular, backlighting of an electronic display described herein employs a plurality of diffraction gratings. The diffraction gratings are used to diffractively scatter or couple light out of a light guide and to direct the coupled-out light in a viewing direction of the electronic display. An amount of light coupled out by individual ones of the diffraction gratings is determined by diffractive coupling efficiency or equivalently diffractive coupling strength of the diffraction gratings. Diffractive feature modulation is used to provide selective control of the diffractive coupling efficiency. In some examples, the selectively controlled diffractive coupling efficiency may compensate for a decrease in light intensity of light guided within the light guide. By compensating for the decrease in light intensity, light coupled out of the light guide by the diffraction gratings may be more uniform along a length of the light guide or a backlight employing same, for example.

According to various embodiments, the coupled-out light forms a plurality of light beams that are directed in the viewing direction. Light beams of the plurality may have different principal angular directions from one another, according to various embodiments of the principles described herein. In particular, the plurality of light beams may form or provide a light field in the viewing direction. In some embodiments, the light beams having the different principal angular directions (also referred to as 'the differently directed light beams') may be employed to display three-dimensional (3-D) information. For example, the differently directed light beams may be modulated and serve as pixels of a 'glasses free' 3-D electronic display. By compensating for changes in light intensity (e.g., the light intensity decrease) using the selectively controlled diffractive coupling efficiency, an electronic display employing diffraction gratings having diffractive feature modulation may exhibit improved uniformity of illumination than is possible otherwise, for example.

Figure 1:
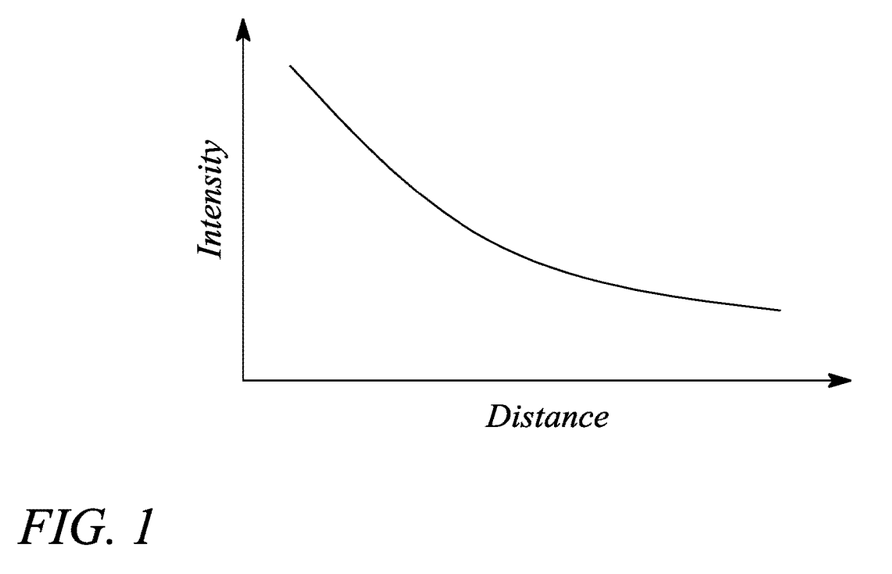
FIG. 1 illustrates a graph of light intensity as a function of distance in a light guide, according to an example consistent with the principles described herein.

FIG. 1 illustrates a graph of light intensity as a function of distance in a light guide, according to an example consistent with the principles described herein. The illustrated light intensity as a function of distance may be consistent with light intensity observed in a light guide used in a diffraction grating-based backlight, for example. In particular, as light propagates along a length of the light guide from an input end to an end opposite the input end (e.g., a terminal end), portions of the guided light may be coupled out, e.g., by diffraction gratings. As the guided light is coupled out, less light remains in the light guide resulting in a decrease in light intensity along a remaining length of the light guide. Light intensity along the length of the light guide may also be affected by other processes including, but not limited to, absorption loss and various forms of scattering loss. According to various examples, the light intensity may decrease exponentially as a function of distance or length, as illustrated in FIG. 1, for example. Embodiments according to the principles described herein may be used to mitigate or compensate for the decrease in light intensity as a function of distance.

Herein, a 'light guide' is defined as a structure that guides light within the structure using total internal reflection. In particular, the light guide may include a core that is substantially transparent at an operational wavelength of the light guide. In various examples, the term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some examples, the light guide may include a coating in addition to or instead of the aforementioned refractive index difference to further facilitate the total internal reflection. The coating may be a reflective coating, for example. According to various examples, the light guide may be any of several light guides including, but not limited to, one or both of a plate or slab guide and a strip guide.

Further herein, the term 'plate' when applied to a light guide as in a 'plate light guide' is defined as a piece-wise or differentially planar layer or sheet. In particular, a plate light guide is defined as a light guide configured to guide light in two substantially orthogonal directions bounded by a top surface and a bottom surface (i.e., opposite surfaces) of the light guide. Further, by definition herein, the top and bottom surfaces are both separated from one another and may be substantially parallel to one another in at least a differential sense. That is, within any differentially small region of the plate light guide, the top and bottom surfaces are substantially parallel or co-planar. In some examples, a plate light guide may be substantially flat (e.g., confined to a plane) and so the plate light guide is a planar light guide. In other examples, the plate light guide may be curved in one or two orthogonal dimensions. For example, the plate light guide may be curved in a single dimension to form a cylindrical shaped plate light guide. In various examples however, any curvature has a radius of curvature sufficiently large to insure that total internal reflection is maintained within the plate light guide to guide light.

According to various examples described herein, a diffraction grating (e.g., a multibeam diffraction grating) may be employed to scatter or couple light out of a light guide (e.g., a plate light guide) as a light beam. Herein, a 'diffraction grating' is generally defined as a plurality of features (i.e., diffractive features) arranged to provide diffraction of light incident on the diffraction grating. In some examples, the plurality of features may be arranged in a periodic or quasi-periodic manner. For example, the diffraction grating may include a plurality of features (e.g., a plurality of grooves in a material surface) arranged in a one-dimensional (1-D) array. In other examples, the diffraction grating may be a two-dimensional (2-D) array of features. The diffraction grating may be a 2-D array of bumps on or holes in a material surface, for example.

As such, and by definition herein, the 'diffraction grating' is a structure that provides diffraction of light incident on the diffraction grating. If the light is incident on the diffraction grating from a light guide, the provided diffraction or diffractive scattering may result in, and thus be referred to as, 'diffractive coupling' in that the diffraction grating may couple light out of the light guide by diffraction. The diffraction grating also redirects or changes an angle of the light by diffraction (i.e., at a diffractive angle). In particular, as a result of diffraction, light leaving the diffraction grating (i.e., diffracted light) generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure including diffractive features that diffractively redirects light incident on the diffraction grating and, if the light is incident from a light guide, the diffraction grating may also diffractively couple out the light from light guide.

Further, by definition herein, the features of a diffraction grating are referred to as 'diffractive features' and may be one or more of at, in and on a surface (i.e., a boundary between two materials). The surface may be a surface of a plate light guide, for example. The diffractive features may include any of a variety of structures that diffract light including, but not limited to, one or more of grooves, ridges, holes and bumps at, in or on the surface. For example, the diffraction grating may include a plurality of parallel grooves in the material surface. In another example, the diffraction grating may include a plurality of parallel ridges rising out of the material surface. The diffractive features (e.g., grooves, ridges, holes, bumps, etc.) may have any of a variety of cross sectional shapes or profiles that provide diffraction including, but not limited to, one or more of a sinusoidal profile, a rectangular profile (e.g., a binary diffraction grating), a triangular profile and a saw tooth profile (e.g., a blazed grating).

By definition herein, a 'multibeam diffraction grating' is a diffraction grating that produces coupled-out light that includes a plurality of light beams. Further, the light beams of the plurality produced by a multibeam diffraction grating have different principal angular directions from one another, by definition herein. In particular, by definition, a light beam of the plurality has a predetermined principal angular direction that is different from another light beam of the light beam plurality as a result of diffractive coupling and diffractive redirection of incident light by the multibeam diffraction grating. For example, the light beam plurality may include eight light beams that have eight different principal angular directions. The eight light beams in combination (i.e., the light beam plurality) may represent a light field, for example. According to various examples, the different principal angular directions of the various light beams are determined by a combination of a grating pitch or spacing and an orientation or rotation of the diffractive features of the multibeam diffraction grating at points of origin of the respective light beams relative to a propagation direction of the light incident on the multibeam diffraction grating.

According to various embodiments described herein, the light coupled out of the light guide by the diffraction grating (e.g., a multibeam diffraction grating) represents a pixel of an electronic display. In particular, the light guide having a multibeam diffraction grating to produce the light beams of the plurality having different principal angular directions may be part of a backlight of or used in conjunction with an electronic display such as, but not limited to, a 'glasses free' three-dimensional (3-D) electronic display (e.g., also referred to as a multiview or 'holographic' electronic display or an autostereoscopic display). As such, the differently directed light beams produced by coupling out guided light from the light guide using the multibeam diffractive grating may be or represent 'pixels' of the 3-D electronic display. Moreover, the differently directed light beams may form a light field, according to various examples.

Herein, a 'light source' is defined as a source of light (e.g., an apparatus or device that produces and emits light). For example, the light source may be a light emitting diode (LED) that emits light when activated. Herein, a light source may be substantially any source of light or optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by the light source may have a color (i.e., may include a particular wavelength of light), or may be a range of wavelengths (e.g., white light).

Further, as used herein, the article 'a' is intended to have its ordinary meaning in the patent arts, namely 'one or more'. For example, 'a grating' means one or more gratings and as such, 'the grating' means 'the grating(s)' herein. Also, any reference herein to 'top', 'bottom', 'upper', 'lower', 'up', 'down', 'front', back', 'first', 'second', 'left' or 'right' is not intended to be a limitation herein. Herein, the term 'about' when applied to a value generally means within the tolerance range of the equipment used to produce the value, or in some examples, means plus or minus 10%, or plus or minus 5%, or plus or minus 1%, unless otherwise expressly specified. Further, the term 'substantially' as used herein means a majority, or almost all, or all, or an amount within a range of about 51% to about 100%, for example. Moreover, examples herein are intended to be illustrative only and are presented for discussion purposes and not by way of limitation.

Figure 2A:
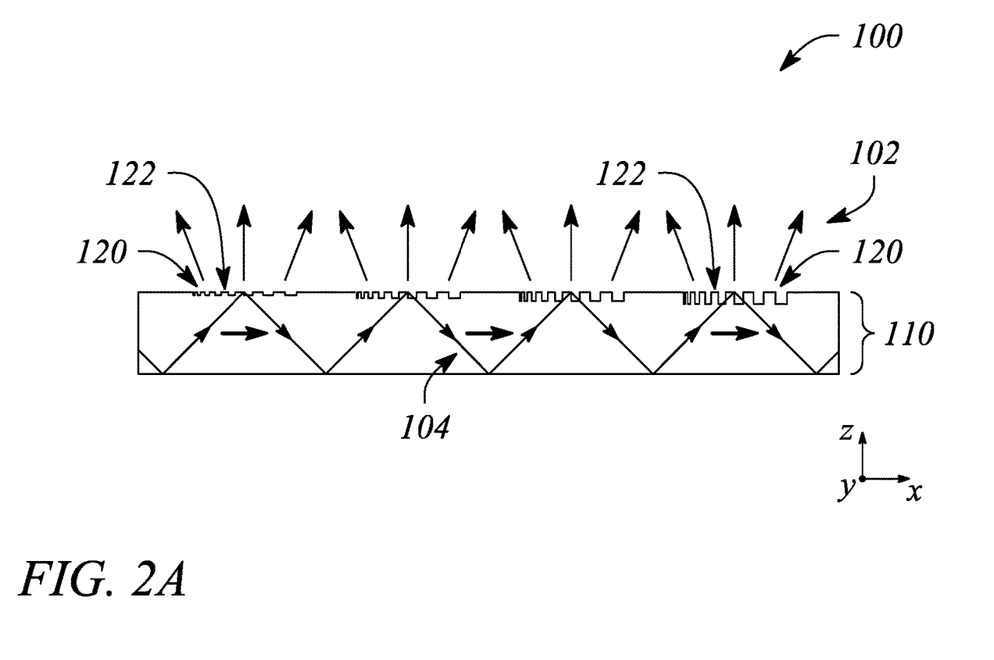
FIG. 2A illustrates a cross sectional view of a diffraction grating-based backlight with modulated diffractive coupling in an example, according to an embodiment consistent with the principles described herein.
Figure 2B:
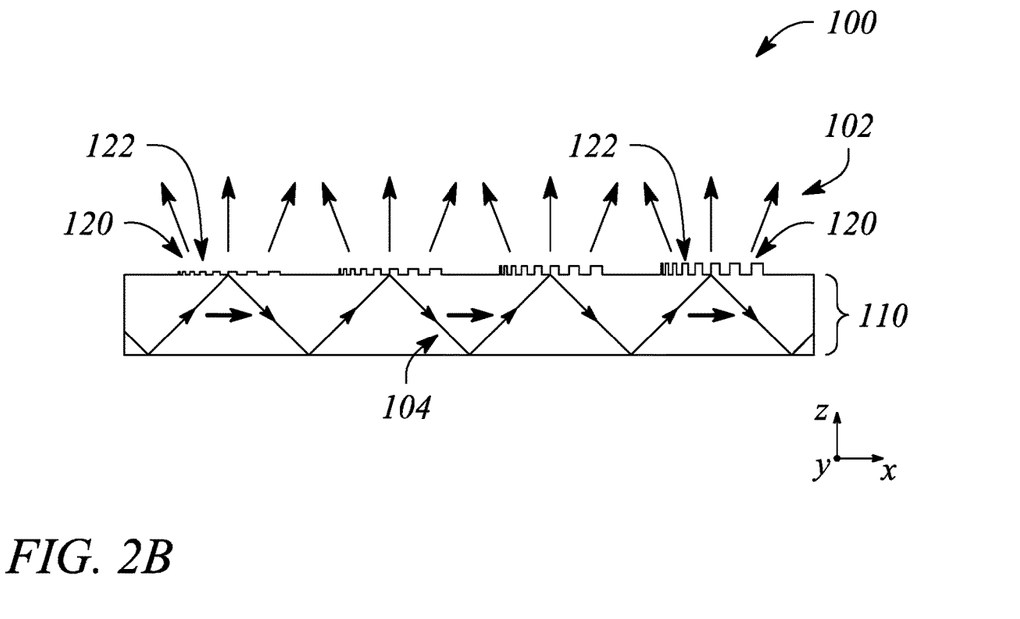
FIG. 2B illustrates a cross sectional view of a diffraction grating-based backlight with modulated diffractive coupling in an example, according to another embodiment consistent with the principles described herein.

In accordance with some embodiments of the principles described herein, a diffraction grating-based backlight is provided. FIG. 2A illustrates a cross sectional view of a diffraction grating-based backlight 100 with modulated diffractive coupling in an example, according to an embodiment consistent with the principles described herein. FIG. 2B illustrates a cross sectional view of a diffraction grating-based backlight 100 with modulated diffractive coupling in an example, according to another embodiment consistent with the principles described herein. As illustrated in FIGS. 2A and 2B, diffractive coupling modulation is used to vary or selectively control a diffractive coupling efficiency or diffractive coupling strength of the diffraction grating-based backlight 100. The controlled diffractive coupling efficiency may be used to compensate for or mitigate an effect of a variation in light intensity within the diffraction grating-based backlight 100, according to various embodiments.

For example, the controlled diffractive coupling efficiency may be used to mitigate or compensate for the effects of an exponential decrease in light intensity along a length of the diffraction grating-based backlight 100 due to out-coupling or scattering of light from the diffraction grating-based backlight 100. The out-coupling may be used to form a plurality of light beams 102 directed away from a surface of the diffraction grating-based backlight 100 (e.g., a to form a light field), for example. In some embodiments, the diffraction grating-based backlight 100 may be a light source or 'backlight' of an electronic display. In particular, according to some embodiments, the electronic display may be a so-called 'glasses free' three-dimensional (3-D) electronic display (e.g., a multiview display or autostereoscopic display) in which the light beams 102 correspond to pixels associated with different 'views' of the 3-D display.

In particular, the light beams 102 may form a light field in a viewing direction of the electronic display. A light beam 102 of the plurality of light beams 102 (and within the light field) provided by the diffraction grating-based backlight 100 may be configured to have a different principal angular direction from other light beams 102 of the plurality, according to some embodiments. Further, the light beam 102 may have both a predetermined direction (principal angular direction) and a relatively narrow angular spread within the light field. The principal angular direction of the light beam 102 may correspond to an angular direction of a particular view of the 3-D electronic display, for example. As such, the light beam 102 may represent or correspond to a pixel of the 3-D electronic display, according to some examples.

In other embodiments, the light beams 102 of the plurality may have substantially similar predetermined principal angular directions (not illustrated in FIGS. 2A-2B). The similarly directed light beams 102 generally do not form a light field, but instead represent out-coupled light that is substantially unidirectional. The similarly directed light beams 102 may be used to backlight a two-dimensional (2-D) display, for example.

In some embodiments, the light beams 102 may be modulated (e.g., by a light valve as described below). The modulation of the light beams 102 directed in different angular directions away from the diffraction grating-based backlight 100 may be particularly useful for dynamic 3-D electronic display applications, for example. That is, the individually modulated light beams 102 directed in a particular view direction may represent dynamic pixels of the 3-D electronic display corresponding to the particular view direction.

As illustrated in FIGS. 2A and 2B, the diffraction grating-based backlight 100 comprises a light guide 110. In particular, the light guide 110 may be a plate light guide 110, according to some embodiments. The light guide 110 is configured to guide light from a light source (not illustrated in FIGS. 2A-2B) as guided light 104. For example, the light guide 110 may include a dielectric material configured as an optical waveguide. The dielectric material may have a first refractive index that is greater than a second refractive index of a medium surrounding the dielectric optical waveguide. The difference in refractive indices is configured to facilitate total internal reflection of the guided light 104 according to one or more guided modes of the light guide 110, for example.

In some embodiments, the light from the light source is guided as a beam of light 104 along a length of the light guide 110. Further, the light guide 110 may be configured to guide the light (i.e., the guided light beam 104) at a non-zero propagation angle. The guided light beam 104 may be guided at the non-zero propagation angle within the light guide 110 using total internal reflection, for example.

As defined herein, the non-zero propagation angle is an angle relative to a surface (e.g., a top surface or a bottom surface) of the light guide 110. In some examples, the non-zero propagation angle of the guided light beam 104 may be between about ten (10) degrees and about fifty (50) degrees or, in some examples, between about twenty (20) degrees and about forty (40) degrees, or between about twenty-five (25) degrees and about thirty-five (35) degrees. For example, the non-zero propagation angle may be about thirty (30) degrees. In other examples, the non-zero propagation angle may be about 20 degrees, or about 25 degrees, or about 35 degrees.

In some examples, the light from a light source is introduced or coupled into the light guide 110 at the non-zero propagation angle (e.g., about 30-35 degrees). One or more of a lens, a mirror or similar reflector (e.g., a tilted collimating reflector), and a prism (not illustrated) may facilitate coupling light into an input end the light guide 110 as the beam of light at the non-zero propagation angle. Once coupled into the light guide 110, the guided light beam 104 propagates along the light guide 110 in a direction that is generally away from the input end (e.g., illustrated by bold arrows pointing along an x-axis in FIGS. 2A-2B). Further, the guided light beam 104 propagates by reflecting or 'bouncing' between the top surface and the bottom surface of the light guide 110 at the non-zero propagation angle (e.g., illustrated by an extended, angled arrow representing a light ray of the guided light beam 104).

The guided light beam 104 produced by coupling light into the light guide 110 may be a collimated light beam, according to some examples. In particular, by 'collimated light beam' it is meant that rays of light within the guided light beam 104 are substantially parallel to one another within the guided light beam 104. Rays of light that diverge or are scattered from the collimated light beam of the guided light beam 104 are not considered to be part of the collimated light beam, by definition herein. Collimation of the light to produce the collimated guided light beam 104 may be provided by the lens or mirror (e.g., tilted collimating reflector, etc.) used to couple the light into the light guide 110, for example.

In some examples, the light guide 110 (e.g., as a plate light guide 110) may be a slab or plate optical waveguide comprising an extended, substantially planar sheet of optically transparent, dielectric material. The substantially planar sheet of dielectric material is configured to guide the guided light beam 104 using total internal reflection. According to various examples, the optically transparent material of the light guide 110 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some examples, the light guide 110 may further include a cladding layer on at least a portion of a surface (e.g., one or both of the top surface and the bottom surface) of the light guide 110 (not illustrated). The cladding layer may be used to further facilitate total internal reflection, according to some examples.

According to various embodiments, the diffraction grating-based backlight 100 further includes a plurality of diffraction gratings 120. The plurality of diffraction gratings 120 may be arranged as or represent an array of diffraction gratings 120, for example. As illustrated in FIGS. 2A-2B, the diffraction gratings 120 are located at a surface of the light guide 110 (e.g., a top or front surface). In other examples (not illustrated), one or more of the diffraction gratings 120 may be located within the light guide 110.

A diffraction grating 120 of the plurality is configured to scatter or couple out a portion of the guided light beam 104 from the light guide 110 by or using diffractive coupling (e.g., also referred to as 'diffractive scattering'), according to various embodiments. For example, the portion of the guided light beam 104 may be diffractively coupled out by the diffraction grating 120 through the light guide surface (e.g., through the top surface of the light guide 110). Further, the diffraction grating 120 is configured to diffractively couple out the portion of the guided light beam 104 as a coupled-out light beam (e.g., a light beam 102). The coupled-out light beam 102 is directed away from the light guide surface at a predetermined principal angular direction, according to various examples. In particular, the coupled-out portion of the guided light beam 104 is diffractively redirected away from the light guide surface by the plurality of diffraction gratings 120 as a plurality of light beams 102. As discussed above, each of the light beams 102 of the light beam plurality may have a different principal angular direction and the light beam plurality may represent a light field, according to some examples. According to other examples, each of the light beams 102 of the light beam plurality may have substantially the same principal angular direction and the light beam plurality may represent substantially unidirectional light as opposed to the light field represented by the light beam plurality having light beams with different principal angular directions.

According to various embodiments, each of the diffraction gratings 120 comprises a plurality of diffractive features 122 that provide diffraction. The provided diffraction is responsible for the diffractive coupling of the portion of the guided light beam 104 out of the light guide 110. For example, the diffraction grating 120 may include one or both of grooves in a surface of the light guide 110 and ridges protruding from the light guide surface that serve as the diffractive features 122. The grooves and ridges may be arranged parallel or substantially parallel to one another and, at least at some point, perpendicular to a propagation direction of the guided light beam 104 that is to be coupled out by the diffraction grating 120.

In some examples, the grooves or ridges may be etched, milled or molded into the surface or applied on the surface. As such, a material of the diffraction grating 120 may include a material of the light guide 110. As illustrated in FIG. 2A, for example, the diffraction gratings 120 comprise substantially parallel grooves formed in the surface of the light guide 110. In FIG. 2B, the diffraction gratings 120 comprise substantially parallel ridges that protrude from the light guide surface, for example. In other examples (not illustrated), the diffraction gratings 120 may be implemented in or as a film or layer applied or affixed to the light guide surface.

The plurality of diffraction gratings 120 may be arranged in a variety of configurations at, on or in the surface of the light guide 110, according to various examples. For example, the plurality of diffraction gratings 120 may be arranged in columns and rows across the light guide surface (e.g., as an array). In another example, a plurality of diffraction gratings 120 may be arranged in groups (e.g., a group of three gratings, each grating in the group being associated with a different color of light) and the groups may be arranged in rows and columns. In yet another example, the plurality of diffraction gratings 120 may be distributed substantially randomly across the surface of the light guide 110.

According to various embodiments, the diffractive features 122 of the diffraction gratings 120 of the plurality comprise a diffractive feature modulation. The diffractive feature modulation is configured to selectively control a diffractive coupling efficiency, or equivalently a diffractive coupling strength, of the diffractive gratings 120. In particular, diffractive coupling efficiency is selectively controlled by the diffractive feature modulation as a function of length along the light guide surface. Moreover, the diffractive feature modulation provides selective control of the diffractive coupling efficiency as a function of length along the plurality of diffractive gratings 120 (e.g., arranged as an array). For example, the diffractive feature modulation may be configured to provide an increase (e.g., an exponential increase) in the diffractive coupling efficiency as a function of length along the light guide surface to compensate for an exponential decrease in an intensity of the guided light beam due to the diffractive coupling-out of the guided light beam portion. The exponential increase may be configured to be about inverse to the exponential decrease in an intensity of the guided light beam 104 within the light guide 110 as a function of the light guide length, for example. In other examples, the diffractive feature modulation may be configured to provide another change in the diffractive coupling efficiency as a function of length including, but not limited to, an exponential decrease, a linear increase or decrease, a quadratic increase or decrease, or a sinusoidal in the diffractive coupling efficiency.

According to various embodiments, the diffractive feature modulation comprises a modulation of or variation in characteristics of the diffractive features 122 of adjacent diffraction gratings 120. As used herein, the term 'characteristic' when applied to diffractive features 122 is defined as one or more of a physical size, a shape and an arrangement of the diffractive features 122 within the diffraction grating 120. In some embodiments, the diffractive feature modulation may be substantially static or substantially unchanging as a function of time. That is, the diffractive feature modulation represents a change or variation of the diffractive features 122 with distance or length but not with time. As such, in some embodiments, the diffractive feature modulation may be referred to as 'DC diffractive feature modulation,' where 'DC' is used in a manner analogous to 'direct current' or 'DC' as is used in electronics to signify a constant value (e.g., of current or voltage) as a function of time.

As employed herein, modulation of diffractive feature characteristics (i.e., diffractive feature modulation) generally does not include a variation in an overall size of the diffraction grating 120, by definition herein. In particular, while an overall size of the diffraction grating 120 may also be used to control diffraction coupling efficiency of a diffraction grating 120, diffraction feature modulation either does not employ or does not exclusively employ diffraction grating size, as used herein. That is, diffraction grating size may be employed in addition to but not instead of diffraction feature modulation to selectively control diffractive coupling efficiency, according to some embodiments. However, in other embodiments, the plurality of diffractive gratings 120 comprises diffraction gratings having substantially equal size and diffractive coupling efficiency is selectively controlled using diffractive feature modulation alone.

According to some embodiments, the diffractive feature modulation comprises modulation of diffractive feature amplitude. In particular, an amplitude of the diffractive features 122 may be modulated or varied from one diffraction grating 120 to the next as a function of distance to realize the diffractive feature modulation. For example, a depth of grooves or a height of ridges of the diffraction gratings 120 (i.e., diffractive feature amplitude) may be varied as a function of distance along the light guide 110. In an example, the groove depth or ridge height of each successive diffraction grating 120 may be increased from a light guide end adjacent to the light source (i.e., the input end) to an opposite end of the light guide 110 (i.e., the terminal end). Increasing the groove depth or the ridge height of the successive diffraction gratings 120 increases the diffractive coupling efficiency or diffractive coupling strength of the diffraction gratings 120 as a function of length along the light guide 110.

FIG. 2A illustrates diffractive feature modulation comprising modulation of groove depth as a function of length or equivalently as a function of distance along the light guide 110. In particular, groove depth of successive diffraction gratings 120 increases from a diffraction grating 120 adjacent to the input end (left side) of the light guide 110 to a diffraction grating 120 adjacent to the terminal end (right side) of the light guide 110, as illustrated in FIG. 2A. FIG. 2B illustrates diffractive feature modulation comprising ridge height modulation as a function of length along the light guide 110. In particular, the ridge heights of successive diffraction gratings 120 increase from the input end to the terminal end (right to left) of the light guide 110, as illustrated in FIG. 2B.

The groove depth variation or the ridge height variation of diffractive feature amplitude modulation may be provided (e.g., during manufacture) of the diffraction gratings 120 using techniques including, but not limited to, grey tone lithography, multiple-level dry etching, and nanoimprint lithography. Grey tone lithography comprises using a resist mask having different feature depths representing the grooves or the ridges of the diffraction gratings 120. Controlling exposure times of the resist, for example, may produce the different feature depths. Multiple-level dry etching may employ a plurality of substantially independent lithography-plus-dry etching steps to achieve a similar plurality of different etch levels or depths to produce the diffractive feature amplitude modulation, for example.

According to some examples (not illustrated), the diffractive feature modulation comprises modulation of a duty cycle of the diffractive features of the diffraction gratings 120. In particular, a ratio of width-to-pitch of the grooves or the ridges may be varied between adjacent diffraction gratings 120 of the plurality to provide the duty cycle modulation. According to some examples, the width-to-pitch ratio may be varied around a mean value of about fifty percent (50%). Varying the width-to-pitch ratio in a vicinity around 50% may minimize production of higher order diffraction components, for example. For example, the duty cycle modulation may comprise a width-to-pitch ratio variation between about thirty percent (30%) and about seventy percent (70%). In another example, the width-to-pitch ratio variation may be between about forty percent (40%) and about sixty percent (60%) or between about forty-five percent (45%) and about fifty-five percent (55%).

According to some embodiments, an effective density of the individual diffractive features 122 may be varied or modulated to provide the diffractive feature modulation. In particular, diffractive feature modulation may comprise sub-wavelength gaps in the diffractive features 122. The subwavelength gaps are configured to modulate an effective density or equivalently an effective local diffractive coupling strength of the individual diffractive features 122. Using the subwavelength gaps is referred to as 'effective density modulation' of diffractive features herein since the number, width and spacing of the subwavelength gaps may change an effective density of individual ones of the diffractive features 122 resulting in an effective change in diffractive strength thereof. Note that subwavelength gaps are employed in effective density modulation to avoid creation of additional diffraction orders, according to some embodiments.

Figure 3:
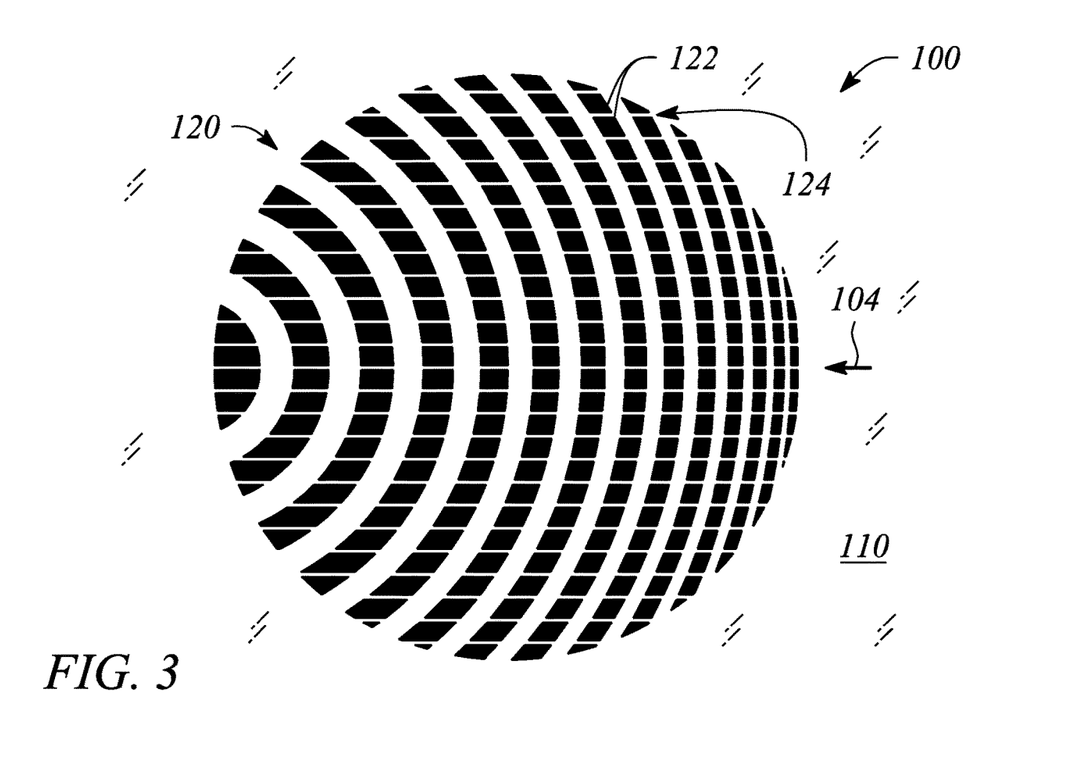
FIG. 3 illustrates a top view of a diffraction grating with subwavelength gaps in an example, according to an embodiment consistent with the principles described herein.

FIG. 3 illustrates a top view of a diffraction grating 120 including subwavelength gaps 124 in an example, according to an embodiment consistent with the principles described herein. In particular, FIG. 3 illustrates a top view of a diffraction grating 120 that is a multibeam diffraction grating 120, by way of example and not limitation, which has subwavelength gaps 124 between the diffractive features 122. Multibeam diffraction gratings 120 are described in more detail below and with reference to FIGS. 4A and 4B.

Referring to FIG. 3, the subwavelength gaps 124 between the diffractive features 122 may be substantially parallel with a propagation direction of the guided light beam 104 (e.g., indicated by a bold arrow labeled 104) along the light guide 110. The guided light beam 104 is to be coupled out of the light guide 110 by the diffraction grating 120. Varying a one or more of a number (i.e., density), a width, and a spacing of the subwavelength gaps 124 of a diffraction grating 120 provides the diffractive feature modulation, according to some embodiments.

According to some embodiments, diffractive feature modulation may comprise one or more of modulation of diffractive feature amplitude, modulation of a duty cycle of the diffractive features, and modulation of an effective density of subwavelength gaps 124 in the diffractive features. In particular, different ones of diffractive feature modulations (i.e., diffractive feature amplitude modulation, diffractive feature duty cycle modulation and diffractive feature effective density modulation) may affect the diffractive coupling efficiency differently as a function of wavelength of the guided light beam 104. For example, combining the various different modulation types may facilitate balancing or tuning of the diffractive coupling efficiency as a function of wavelength (e.g., to fine tune color balancing), for example. Further, according to some embodiments, the diffractive feature modulation may be substantially uniform along the length, while substantially non-uniform diffractive feature modulation may be employed in other embodiments.

According to some embodiments, the plurality of diffraction gratings 120 comprises a multibeam diffraction grating 120. For example, all or substantially all of the diffraction gratings 120 of the plurality may be multibeam diffraction gratings 120. The multibeam diffraction grating 120 is a diffraction grating 120 that is configured to couple out the portion of the guided light beam 104 as a plurality of light beams 102 (e.g., as illustrated in FIGS. 2A and 2B), wherein a light beam 102 of the plurality has a different principal angular direction from other light beams 102 of the light beam plurality. Together, the plurality of light beams 102 coupled out by the multibeam diffraction grating 120 form a light field, according to various embodiments.

According to various examples, the multibeam diffraction grating 120 may comprise a chirped diffraction grating 120. By definition, the 'chirped' diffraction grating 120 is a diffraction grating exhibiting or having a diffraction spacing of the diffractive features that varies across an extent or length of the chirped diffraction grating 120, e.g., as illustrated in FIGS. 2A and 2B. Herein, the varying diffraction spacing is referred to as a 'chirp'. As a result, the guided light beam 104 that is diffractively coupled out of the light guide 110 exits or is emitted from the chirped diffraction grating 120 as the light beams 102 at different diffraction angles corresponding to different points of origin across the chirped diffraction grating 120. By virtue of a predefined chirp, the chirped diffraction grating 120 is responsible for the predetermined and different principal angular directions of the coupled-out light beams 102 of the light beam plurality.

Figure 4A:
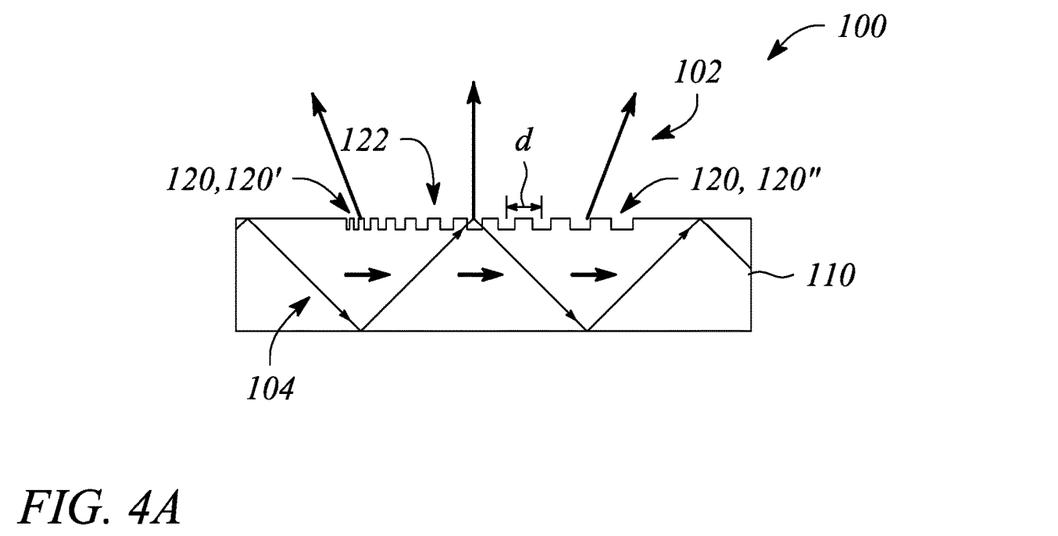
FIG. 4A illustrates a cross sectional view of a multibeam diffraction grating-based backlight in an example, according to an embodiment consistent with the principles described herein.
Figure 4B:
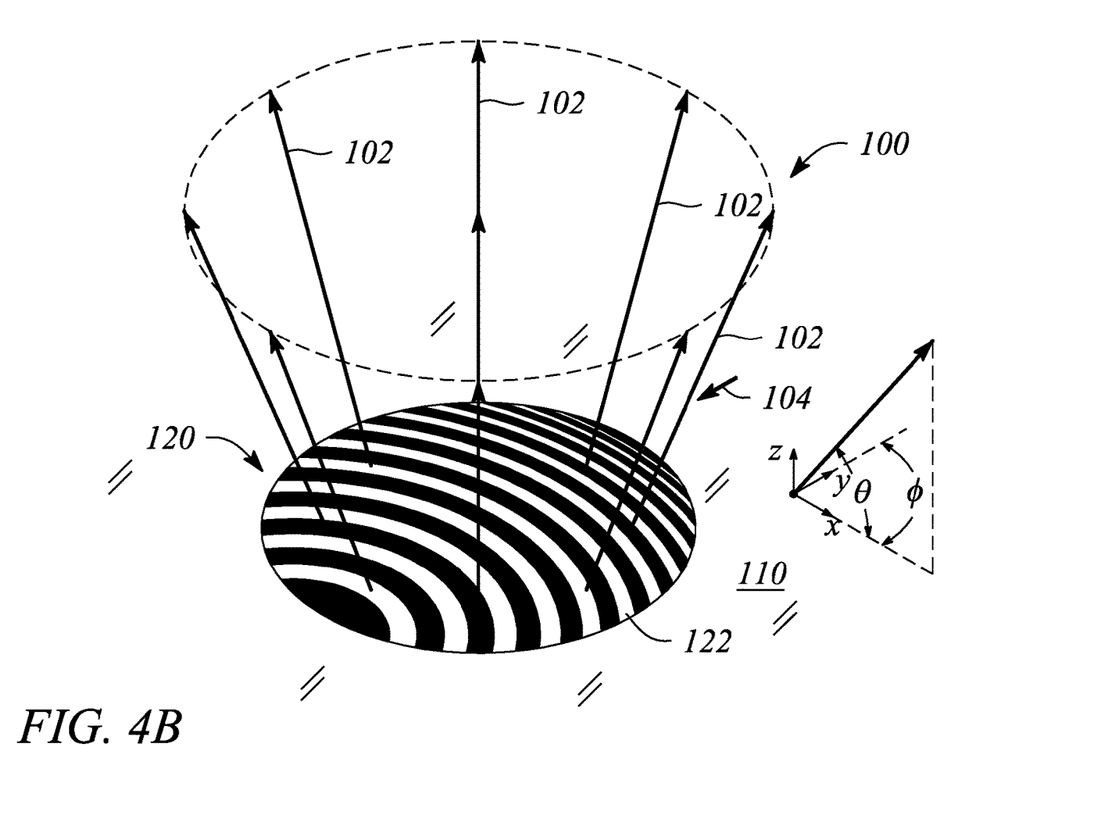
FIG. 4B illustrates a perspective view of the multibeam diffraction grating-based backlight of FIG. 4A in an example, according to an embodiment consistent with the principles described herein.

FIG. 4A illustrates a cross sectional view of a multibeam diffraction grating-based backlight 100 in an example, according to an embodiment consistent with the principles described herein. FIG. 4B illustrates a perspective view of the multibeam diffraction grating-based backlight 100 of FIG. 4A in an example, according to an embodiment consistent with the principles described herein. As illustrated therein, the multibeam diffraction grating-based backlight 100 comprises a multibeam diffraction grating 120. The multibeam diffraction grating 120 comprises grooves in a surface of the light guide 110, by way of example and not limitation. For example, the multibeam diffraction grating 120 illustrated in FIGS. 4A and 4B may be one of the groove-based diffraction gratings 120 illustrated in FIG. 2A.

As illustrated in FIGS. 4A-4B (and also FIGS. 2A-2B by way of example not limitation), the multibeam diffraction grating 120 is a chirped diffraction grating. In particular, as illustrated, the diffractive features 122 are closer together at a first end 120' of the multibeam diffraction grating 120 than at a second end 120". Further, the diffractive spacing d of the illustrated diffractive features 122 varies linearly from the first end 120' to the second end 120". In some examples, the chirped diffraction grating 120 may have or exhibit a chirp of the diffractive spacing d that varies linearly with distance. As such, the chirped diffraction grating 120 may be referred to as a 'linearly chirped' diffraction grating.

In some examples, the light beams 102 produced by coupling light out of the light guide 110 using the multibeam diffraction grating 120 may diverge (i.e., be diverging light beams 102) when the guided light beam 104 propagates in the light guide 110 in a direction from the first end 120' of the multibeam diffraction grating 120 to the second end 120" of the multibeam diffraction grating 120 (e.g., as illustrated in FIG. 4A). Alternatively, converging light beams 102 may be produced when the guided light beam 104 propagates in the reverse direction in the light guide 110, i.e., from the second end 120" to the first end 120' of the multibeam diffraction grating 120, according to other examples (not illustrated).

In another example (not illustrated), the chirped diffraction grating 120 may exhibit a non-linear chirp of the diffractive spacing d. Various non-linear chirps that may be used to realize the chirped diffraction grating 120 include, but are not limited to, an exponential chirp, a logarithmic chirp or a chirp that varies in another, substantially non-uniform or random but still monotonic manner. Non-monotonic chirps such as, but not limited to, a sinusoidal chirp or a triangle or sawtooth chirp, may also be employed. Combinations of any of these types of chirps may also be employed.

As illustrated in FIG. 4B, the multibeam diffraction grating 120 includes diffractive features 122 (e.g., grooves or ridges) in, at or on a surface of the light guide 110 that are both chirped and curved (i.e., the multibeam diffraction grating 120 is a curved, chirped diffraction grating). The guided light beam 104 has an incident direction relative to the multibeam diffraction grating 120 and the light guide 110, as illustrated by a bold arrow labeled 104 in FIG. 4B. Also illustrated is the plurality of coupled-out or emitted light beams 102 pointing away from the multibeam diffraction grating 120 at the surface of the light guide 110. The illustrated light beams 102 are emitted in a plurality of predetermined different principal angular directions. In particular, the predetermined different principal angular directions of the emitted light beams 102 are different in both azimuth and elevation (e.g., to form a light field), as illustrated. According to various examples, both the predefined chirp of the diffractive features 122 and the curve of the diffractive features 122 may be responsible for the predetermined different principle angular directions of the emitted light beams 102.

For example, due to the curve, the diffractive features 122 within the multibeam diffraction grating 120 may have varying orientations relative to an incident direction of the guided light beam 104. In particular, an orientation of the diffractive features 122 at a first point or location within the multibeam diffraction grating 120 may differ from an orientation of the diffractive features 122 at another point or location relative to the guided light beam incident direction. With respect to the coupled-out or emitted light beam 102, an azimuthal component of the principal angular direction $\{\theta, \phi\}$ of the light beam 102 may be determined by or correspond to the azimuthal orientation angle $\phi_f$ of the diffractive features 122 at a point of origin of the light beam 102 (i.e., at a point where the incident guided light 104 is coupled out), according to some examples. As such, the varying orientations of the diffractive features 122 within the multibeam diffraction grating 120 produce different light beams 102 having different principle angular directions $\{\theta, \phi\}$, at least in terms of their respective azimuthal components $\phi$.

In particular, at different points along the curve of the diffractive features 122, an 'underlying diffraction grating' of the multibeam diffraction grating 120 associated with the curved diffractive features 122 has different azimuthal orientation angles $\phi_f$. Thus, at a given point along the curved diffractive features 122, the curve has a particular azimuthal orientation angle $\phi_f$ that generally differs from the azimuthal orientation angle $\phi_f$ another point along the curved diffractive features 122. Further, the particular azimuthal orientation angle $\phi_f$ results in a corresponding azimuthal component of a principal angular direction $\{\theta, \phi\}$ of a light beam 102 emitted from the given point. In some examples, the curve of the diffractive features (e.g., grooves, ridges, etc.) may represent a section of a circle. The circle may be coplanar with the light guide surface. In other examples, the curve may represent a section of an ellipse or another curved shape, e.g., that is coplanar with the light guide surface.

In other examples, the multibeam diffraction grating 120 may include diffractive features 122 that are 'piecewise' curved. In particular, while the diffractive feature may not describe a substantially smooth or continuous curve per se, at different points along the diffractive feature within the multibeam diffraction grating 120, the diffractive feature still may be oriented at different angles with respect to the incident direction of the guided light beam 104. For example, the diffractive feature 122 may be a groove including a plurality of substantially straight segments, each segment having a different orientation than an adjacent segment. Together, the different angles of the segments may approximate a curve (e.g., a segment of a circle), according to various examples. In yet other examples, the diffractive features 122 may merely have different orientations relative to the incident direction of the guided light at different locations within the multibeam diffraction grating 120 without approximating a particular curve (e.g., a circle or an ellipse).

The multibeam diffraction grating-based backlight 100 may further include the light source (not illustrated in FIGS. 4A-4B), according to some embodiments. The light source may be configured to provide light that, when coupled into the light guide 110, is the guided light beam 104. In various embodiments, the light source may be substantially any source of light including, but not limited to, one or more of a light emitting diode (LED), a fluorescent light and a laser. In some examples, the light source may produce a substantially monochromatic light having a narrowband spectrum denoted by a particular color. In other examples, the light provided by the light source has a substantially broadband spectrum. For example, the light produced by the light source may be white light and the light source may be a fluorescent light.

According to some embodiments of the principles described herein, an electronic display is provided. In various embodiments, the electronic display is configured to emit modulated light beams as pixels of the electronic display. Further, in various examples, the emitted modulated light beams may be preferentially directed toward a viewing direction of the electronic display as a plurality of differently directed light beams. In some examples, the electronic display is a three-dimensional (3-D) electronic display (e.g., a glasses-free 3-D electronic display). Different ones of the modulated, differently directed light beams may correspond to different 'views' associated with the 3-D electronic display, according to various examples. The different views may provide a 'glasses free' (e.g., autostereoscopic) representation of information being displayed by the 3-D electronic display, for example.

Figure 5:
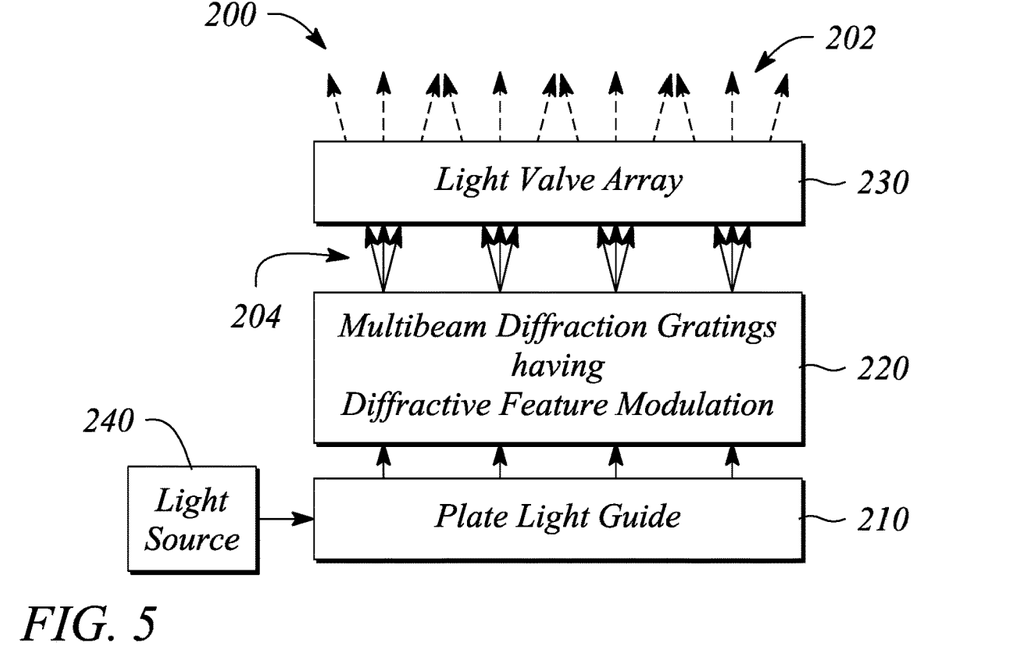
FIG. 5 illustrates a block diagram of an electronic display in an example, according to an embodiment consistent with the principles described herein.

FIG. 5 illustrates a block diagram of an electronic display 200 in an example, according to an embodiment consistent with the principles described herein. In particular, the electronic display 200 illustrated in FIG. 5 is a 3-D electronic display 200 (e.g., a 'glasses free' 3-D electronic display) configured to emit modulated light beams 202 representing pixels corresponding to different views of the 3-D electronic display 200. The emitted, modulated light beams 202 are illustrated as diverging (e.g., as opposed to converging) in FIG. 5 by way of example and not limitation.

The 3-D electronic display 200 illustrated in FIG. 5 includes a plate light guide 210 to guide light. The guided light in the plate light guide 210 is a source of the light that becomes the modulated light beams 202 emitted by the 3-D electronic display 200. According to some examples, the plate light guide 210 may be substantially similar to the light guide 110 described above with respect to diffraction grating-based backlight 100. For example, the plate light guide 210 may be a slab optical waveguide that is a planar sheet of dielectric material configured to guide light by total internal reflection. The guided light may be guided at a non-zero propagation angle as a beam of light. Further, the guided light beam may be a collimated light beam, according to some embodiments.

The 3-D electronic display 200 illustrated in FIG. 5 further includes an array of multibeam diffraction gratings 220. According to various embodiments, the multibeam diffraction gratings 220 of the array have a diffractive feature modulation configured to selectively control a diffractive coupling efficiency of the multibeam diffraction gratings 220. In particular, the selectively controlled diffractive coupling efficiency provided by the diffractive feature modulation is a function of length along the array (or distance along the propagation direction), according to various embodiments.

In some examples, the multibeam diffraction gratings 220 may be substantially similar to the multibeam diffraction gratings 120 of the diffraction grating-based backlight 100, described above. In particular, the multibeam diffraction gratings 220 of the array are configured to couple out a portion of the guided light as a plurality of light beams 204. The multibeam diffraction gratings 220 are configured to couple out the guided light portion according to the controlled diffractive coupling efficiency. That is, an amount of the guided light that is coupled out by a given multibeam diffraction grating 220 of the array is determined by the controlled diffractive coupling efficiency produced by the diffractive feature modulation. Further, the multibeam diffraction grating 220 is configured to direct the light beams 204 in a corresponding plurality of different principal angular directions.

According to some embodiments, the diffractive feature modulation may comprise modulation of an amplitude of diffractive features of the multibeam diffraction gratings 220. Alternatively or in addition to diffractive feature amplitude modulation, the diffractive feature modulation may comprise one or both of a modulation of a duty cycle of the diffractive features and modulation of an effective density of the diffractive features of the multibeam diffraction gratings 220. Various combinations of one or more of diffractive feature amplitude modulation, diffractive feature duty cycle modulation and diffractive feature effective density modulation may be employed, e.g., to provide color balance, etc., as described above.

Further, in some embodiments, the array of multibeam diffraction gratings 220 may include a chirped diffraction grating. In some examples, diffractive features (e.g., grooves, ridges, etc.) of the multibeam diffraction gratings 220 are curved diffractive features. For example, the curved diffractive features may include ridges or grooves that are curved (i.e., continuously curved or piece-wise curved) and spacings between the curved diffractive features that vary as a function of distance across the multibeam diffraction gratings 220 of the array.

As illustrated in FIG. 5, the 3-D electronic display 200 further includes a light valve array 230. The light valve array 230 includes a plurality of light valves configured to modulate the differently directed light beams 204 of the light beam plurality, according to various examples. In particular, the light valves of the light valve array 230 modulate the differently directed light beams 204 to provide the modulated light beams 202 that are or represent pixels of the 3-D electronic display 200. Moreover, different ones of the modulated, differently directed light beams 202 may correspond to different views of the 3-D electronic display. In various examples, different types of light valves in the light valve array 230 may be employed including, but not limited to, liquid crystal (LC) light valves and electrophoretic light valves. Dashed lines are used in FIG. 5 to emphasize modulation of the light beams 202, by way of example.

In some examples (e.g., as illustrated in FIG. 5), the 3-D electronic display 200 further includes a light source 240. The light source 240 is configured to provide light that propagates in the plate light guide 210 as the guided light. In particular, the guided light is light from the light source 240 that is coupled into the edge of the plate light guide 210, according to some examples. In some examples, the light source 240 is substantially similar to the light source described above with respect to the diffraction grating-based backlight 100. For example, the light source 240 may include an LED of a particular color (e.g., red, green, blue) to provide monochromatic light or a broadband light source such as, but not limited to, a fluorescent light, to provide broadband light (e.g., white light).

According to some examples of the principles described herein, a method of electronic display operation is provided. In particular, the method of electronic display operation comprises controlling diffraction coupling efficiency using modulation of diffractive features of a plurality of diffraction gratings.

Figure 6:
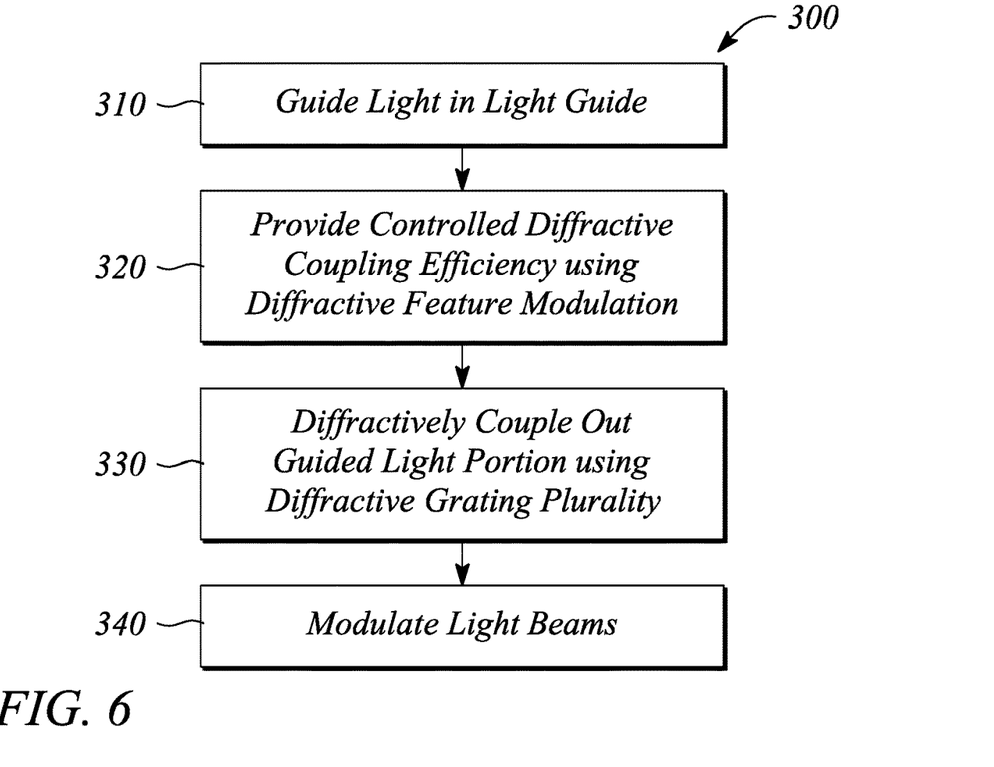
FIG. 6 illustrates a flow chart of a method of electronic display operation in an example, according to an embodiment consistent with the principles described herein.

FIG. 6 illustrates a flow chart of a method 300 of electronic display operation in an example, according to an embodiment consistent with the principles described herein. As illustrated, the method 300 of electronic display operation comprises guiding 310 light in a light guide. In some embodiments, the light guide and the guided light may be substantially similar to the light guide 110 and guided light beam 104, described above with respect to the diffraction grating-based backlight 100. In particular, in some embodiments, the light guide may guide 310 the guided light according to total internal reflection as a beam (e.g., a collimated beam) of light. The light beam may be guided 310 at a non-zero propagation angle, for example. Further, the light guide may be a substantially planar dielectric optical waveguide (e.g., a plate light guide), in some embodiments.

The method 300 of electronic display operation further comprises providing 320 a controlled diffraction coupling efficiency of a plurality of diffraction gratings. The plurality of diffraction gratings may be at a surface of the light guide and may be arranged as an array, for example. According to various embodiments, the controlled diffraction coupling efficiency is provided 320 using modulation of diffractive features of the diffraction gratings. According to some embodiments, the diffractive feature modulation may be substantially similar to the modulation of diffractive features 122, described above with respect to the diffraction grating-based backlight 100. For example, diffractive feature modulation may be one or more of diffractive feature amplitude modulation, diffractive feature duty cycle modulation, and diffractive feature effective density modulation, according to various embodiments.

The method 300 of electronic display operation further includes diffractively coupling out 330 a portion of the guided light using the plurality of diffraction gratings according to the controlled diffraction coupling efficiency. That is, the portion of the guided light that is diffractively coupled out 330 is determined by the controlled diffraction coupling efficiency provided 320 using diffractive feature modulation of the diffraction gratings.

According to various examples, the plurality of diffraction gratings is located at a surface of the light guide. For example, the diffraction gratings may be formed in the surface of the light guide as grooves, ridges, etc. In other examples, the diffraction gratings of the plurality may include a film on the light guide surface. In some examples, the diffraction gratings are substantially similar to the diffraction gratings 120 described above with respect to the diffraction grating-based backlight 100. In particular, the diffraction gratings may be multibeam diffraction gratings configured to produce a plurality of light beams from the diffractively coupled out 320 portion of the guided light. In other examples, the diffraction gratings are located elsewhere including, but not limited to, within the light guide.

The portion of diffractively coupled out 330 guided light of the method 300 of electronic display operation produces a plurality of emitted light beams directed away from the surface of the light guide. Each of the emitted light beams of the light beam plurality is directed away from the surface at a predetermined principal angular direction. In particular, when a diffraction grating is a multibeam diffraction grating, an emitted light beam of the light beam plurality may have a different principal angular direction from other emitted light beams of the light beam plurality. According to some embodiments, the light beams of the light beam plurality may correspond to pixels of the electronic display. In particular, the emitted light beams from the multibeam diffraction grating may correspond to pixels of different views of a three-dimensional (3-D) electronic display.

In some examples, the method 300 of electronic display operation further includes modulating 340 the light beams of the plurality of emitted light beams using a corresponding plurality of light valves. In particular, the plurality of emitted light beams that is diffractively coupled out 330 is modulated 340 by passing through or otherwise interacting with the corresponding plurality of light valves. The modulated light beams may form the pixels of the electronic display (e.g., the 3-D electronic display), according to some embodiments. For example, the modulated 340 light beams may provide a plurality of views of the 3-D electronic display (e.g., a glasses-free, 3-D electronic display).

In some examples, the plurality of light valves used in modulating 340 the plurality of light beams is substantially similar to the light valve array 230 described above with respect to the 3-D electronic display 200. For example, the light valves may include liquid crystal light valves. In another example, the light valves may be another type of light valve including, but not limited to, an electrowetting light valve and an electrophoretic light valve.

Thus, there have been described examples of a diffraction grating-based backlight, a 3-D electronic display and a method of electronic display operation that employ diffractive feature modulation to provide controlled diffraction coupling efficiency as a function of length or distance. It should be understood that the above-described examples are merely illustrative of some of the many specific examples and embodiments that represent the principles described herein. Clearly, those skilled in the art can readily devise numerous other arrangements without departing from the scope as defined by the following claims.

What is claimed is:

1. A diffraction grating-based backlight having controlled diffractive coupling efficiency, the diffraction grating-based backlight comprising:
    a light guide configured to guide light as a guided light beam at a non-zero propagation angle relative to a surface of the light guide, the guided light beam being collimated; and
    a plurality of diffraction gratings spaced apart from one another along the surface of the light guide, each diffraction grating of the plurality of diffraction gratings being configured to diffractively couple out a portion of the guided light beam as a plurality of coupled-out light beams having predetermined principal angular directions within a light field corresponding to different view directions of a three-dimensional (3-D) electronic display that provides 3-D information,
    wherein individual diffraction gratings of the plurality of diffraction gratings each comprise diffractive features having a diffractive feature modulation configured to selectively control a diffractive coupling efficiency of the individual diffraction gratings as a function of a distance of the individual diffraction grating along the light guide surface to compensate for a variation in an intensity of the guided light with the distance.

2. The diffraction grating-based backlight of claim 1, wherein the plurality of diffraction gratings comprises a multibeam diffraction grating configured to couple out the portion of the guided light beam as the plurality of coupled-out light beams.

3. The diffraction grating-based backlight of claim 2, wherein the multibeam diffraction grating is a linearly chirped diffraction grating having curved diffractive features.

4. The diffraction grating-based backlight of claim 2, wherein the plurality of coupled-out light beams having different principal angular directions is configured to form pixels corresponding to different views of the 3-D electronic display.

5. The diffraction grating-based backlight of claim 1, wherein the diffractive feature modulation comprises modulation of diffractive feature amplitude.

6. The diffraction grating-based backlight of claim 1, wherein the diffractive feature modulation comprises modulation of a duty cycle of the diffractive features of the diffraction gratings.

7. The diffraction grating-based backlight of claim 1, wherein the plurality of diffraction gratings comprises diffraction gratings having substantially equal size.

8. The diffraction grating-based backlight of claim 1, wherein the diffractive feature modulation comprises subwavelength gaps in the diffractive features, the subwavelength gaps being configured to modulate an effective local diffractive coupling strength of the diffractive features.

9. The diffraction grating-based backlight of claim 1, wherein the diffractive feature modulation is substantially uniform along a length of the light guide surface.

10. The diffraction grating-based backlight of claim 1, wherein the diffractive feature modulation is configured to compensate for an exponential decrease in an intensity of the guided light beam due to the diffractive coupling out of the guided light beam portion, the compensation to provide substantially uniform intensity of light beams diffractively coupled-out by the plurality of diffraction gratings as a function of distance along the light guide surface.

11. An electronic display comprising the diffraction grating-based backlight of claim 1, the electronic display being the 3-D electronic display wherein the coupled-out light beam corresponds to a pixel of the 3-D electronic display.

12. The 3-D electronic display of claim 1, further comprising a light valve configured to modulate the coupled-out light beam, the diffraction grating being at the surface of the light guide that is adjacent to the light valve.

13. A three-dimensional (3-D) electronic display comprising:
    a plate light guide to guide light as guided light;
    an array of multibeam diffraction gratings having a diffractive feature modulation configured to selectively control a diffractive coupling efficiency of the multibeam diffraction gratings as a function of distance along the array, each multibeam diffraction grating of the multibeam diffraction grating array being configured to couple out a portion of the guided light as a plurality of light beams according to the controlled diffractive coupling efficiency and having a corresponding plurality of different principal angular directions configured to form a light field; and a light valve array configured to modulate the light beams having the different principal angular directions to represent pixels corresponding to different views of the 3-D electronic display, the different principal angular directions of the light beams forming the light field corresponding to view directions of the different views.

14. The 3-D electronic display of claim 13, wherein the diffractive feature modulation comprises one or more of modulation of an amplitude of diffractive features of the multibeam diffraction gratings, modulation of a duty cycle of the diffractive features of the multibeam diffraction gratings, and modulation of an effective density of the diffractive features.

15. The 3-D electronic display of claim 13, wherein a multibeam diffraction grating of the array of multibeam diffraction gratings comprises a chirped diffraction grating having curved diffractive features.

16. The 3-D electronic display of claim 13, wherein the light valve array comprises a plurality of liquid crystal light valves.

17. The 3-D electronic display of claim 13, further comprising a light source, the guided light being light from the light source that is coupled into an edge of the plate light guide and guided at a non-zero propagation angle as a substantially collimated guided light beam within the plate light guide.

18. A method of three-dimensional (3-D) electronic display operation, the method comprising:

guiding light in a light guide as guided light;

providing a controlled diffraction coupling efficiency of diffraction gratings of a plurality of diffraction gratings spaced apart from one another along a surface of the light guide by modulating diffractive features of each of the diffraction gratings as a function of a distance of each of the diffraction gratings along the light guide surface to compensate for a variation of an intensity of the guided light with the distance; and diffractively coupling out a portion of the guided light using the plurality of diffraction gratings according to the controlled diffraction coupling efficiency, diffractively coupling out producing a plurality of light beams directed away from the light guide surface at predetermined principal angular directions to form a light field, wherein the light beams of the light beam plurality correspond to pixels of the 3-D electronic display that displays 3-D information, the predetermined principal angular directions of the light beams corresponding to view directions of different views of the 3-D electronic display.

19. The method of 3-D electronic display operation of claim 18, wherein modulating the diffractive features comprises one or more of modulating an amplitude of diffractive features, modulating a duty cycle of the diffractive features, and modulating an effective density of the diffractive features.

20. The method of 3-D electronic display operation of claim 19, further comprising modulating the plurality of light beams using a corresponding plurality of light valves, wherein the diffraction gratings are multibeam diffraction gratings.

* * * * *